US009258844B2

(12) United States Patent
Kang et al.

(10) Patent No.: US 9,258,844 B2
(45) Date of Patent: Feb. 9, 2016

(54) METHOD AND APPARATUS FOR TRANSMITTING CONTENT IN PORTABLE TERMINAL

(71) Applicant: Samsung Electronics Co., Ltd., Gyeonggi-do (KR)

(72) Inventors: Hyuk Kang, Gyeonggi-do (KR); Jun-Sik Kwon, Gyeonggi-do (KR); Eui-Bum Han, Gyeonggi-do (KR); Gi-Beom Kim, Gyeonggi-do (KR); Joo-Hyung Lee, Seoul (KR); Tae-Hun Lim, Gyeonggi-do (KR); Hyeong-Seok Kim, Seoul (KR); Hyun-Chul Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 50 days.

(21) Appl. No.: 14/297,804

(22) Filed: Jun. 6, 2014

(65) Prior Publication Data

US 2014/0370811 A1 Dec. 18, 2014

(30) Foreign Application Priority Data

Jun. 17, 2013 (KR) ........................ 10-2013-0068910

(51) Int. Cl.
*H04B 7/00* (2006.01)
*H04W 84/18* (2009.01)
(Continued)

(52) U.S. Cl.
CPC .............. *H04W 84/18* (2013.01); *H04W 88/08* (2013.01); *H04W 76/043* (2013.01); *H04W 84/20* (2013.01)

(58) Field of Classification Search
CPC .......... G06Q 30/0267; G06Q 30/0242; G06Q 30/0241; H04W 48/16; H04W 4/043; H04W 4/206; H04W 8/18; H04N 21/4126; Y02B 60/43; H04B 7/0814; H04B 7/0817
USPC ................................................ 455/41.2, 41.1
See application file for complete search history.

(56) References Cited

U.S. PATENT DOCUMENTS

| 2007/0073929 A1* | 3/2007 | Takayama | H04W 36/14 710/51 |
| 2009/0198542 A1* | 8/2009 | D'Amore | G06Q 30/02 705/14.15 |

(Continued)

FOREIGN PATENT DOCUMENTS

KR 20120079370 7/2012

*Primary Examiner* — Edward Urban
*Assistant Examiner* — Max Mathew
(74) *Attorney, Agent, or Firm* — The Farrell Law Firm, P.C.

(57) ABSTRACT

A method and an apparatus for transmitting content in a portable terminal are provided. The method includes searching for devices, to each of which content is to be transmitted, by a first communication module, and displaying information indicating devices discovered as a result of the search; determining, when a particular portable terminal to which the content is to be transmitted is selected among the displayed information, whether the selected particular portable terminal is currently performing a communication connection with another portable terminal; requesting and receiving, through a second communication module, in response to determining that the particular portable terminal is currently performing the communication connection with the another portable terminal, an address of a device matched to a selected transmission method; and making a communication connection with the particular portable terminal; transmitting the content to the particular portable terminal, through a third communication module matched to the selected transmission method.

18 Claims, 6 Drawing Sheets

(51) Int. Cl.
H04W 88/08 (2009.01)
*H04W 76/04* (2009.01)
*H04W 84/20* (2009.01)

(56) References Cited

U.S. PATENT DOCUMENTS

| | | | |
|---|---|---|---|
| 2010/0010899 A1* | 1/2010 | Lambert | G06Q 30/02 705/14.58 |
| 2012/0172060 A1 | 7/2012 | Qing et al. | |
| 2012/0315851 A1* | 12/2012 | Park | H04B 7/0814 455/41.2 |
| 2013/0003715 A1* | 1/2013 | Xhafa | H04W 52/0229 370/349 |
| 2013/0090061 A1* | 4/2013 | Linde | H04W 8/005 455/41.2 |
| 2013/0135153 A1* | 5/2013 | Wang | H01Q 1/243 343/700 MS |
| 2013/0165044 A1* | 6/2013 | Xie | H04W 52/0229 455/41.2 |
| 2013/0191518 A1* | 7/2013 | Narayanan | H04W 8/18 709/220 |
| 2014/0055243 A1* | 2/2014 | Kerai | G06Q 10/0833 340/10.1 |
| 2014/0157135 A1* | 6/2014 | Lee | G06F 3/0482 715/738 |
| 2014/0169599 A1* | 6/2014 | Solum | H04R 25/554 381/315 |
| 2014/0342670 A1* | 11/2014 | Kang | H04W 24/08 455/41.2 |
| 2014/0357293 A1* | 12/2014 | Tsaur | H04W 64/00 455/456.1 |
| 2014/0378057 A1* | 12/2014 | Ramon | H04L 9/32 455/41.2 |

* cited by examiner

| AD Type | Byte | Use | Example |
|---|---|---|---|
| TX Power Level | 1 | Measurement of signal strength pathloss = TX PL - Adv_RSSI | TX Power level = +4 (dBm) RSSI on Adv packet = -60 (dBm) passloss = +65 dB |
| Shortened Local Name | 29 ↓ | Broadcast Name or Msg | Use preset name, such as GT-N8000 or Samsung Mobile |
| Random Target Address | 6 | 48-bit address | For example, BT address |
| Manufacturer Specific Data <<Protocol>> | 4 | Company Identifier Code and Protocol Identifier Code | (0x0075) Samsung Electronics (0x0201) SSSP 1.0 |
| Manufacturer Specific Data <<Capability>> | 3 | Capability State (24bit bit-mask) | <<Communication Bitmasks>> (01) Bluetooth BR/EDR (02) Bluetooth AMP (03) Bluetooth LE (04) WiFi (05) WiFi Direct (06) WiFi Display (07) DLNA (All-Share) (08) NFC, RFID (09) ZigBee, RF4CE (10) Ant, Ant+ (11) Proprietary 2.4Ghz (12) Sub-1Ghz (13) Bonjour <<Sensor Bitmasks>> (14) GPS (15) Accelerometer (16) Gyroscope (17) Geomagnetic (18) Pressure (19) Temperature (20) Humidity (21~24) Reserved  Data "0x0000FF" is used to report that 01 to 08 can be supported |
| Manufacturer Specific Data <<Others>> | 2 | Phone State | <<Phone State Bitmasks>> (01) Silent mode (02) Screen Rotation (03) Power Saving (04) Notification (05) Mobile Data (06) Driving mode (07) Sync mode (08~16) Reserved |

FIG.3B

METHOD AND APPARATUS FOR TRANSMITTING CONTENT IN PORTABLE TERMINAL

PRIORITY

This application claims priority under 35 U.S.C. §119(a) to Korean Patent Application Serial No. 10-2013-0068910, which was filed in the Korean Intellectual Property Office on Jun. 17, 2013, the entire contents of which are incorporated herein by reference.

BACKGROUND OF THE INVENTION

1. Field of the Invention

The present invention relates generally to the transmission of content, and more particularly, to a method and an apparatus for transmitting content in a portable terminal.

2. Description of the Related Art

Generally, when two portable terminals share content such as an image, a video, etc., the content can be transmitted between the two portable terminals by using Wireless Fidelity (Wi-Fi) Direct, Near Field Communication (NFC), or Bluetooth. At this time, a user must determine which technology, from among these technologies, is to be used to transmit the content. The user also must perform a preset process for the determined technology. When the transmission of the content is completed, the user also must also perform a process for restoring each portable terminal to a state existing before performance of the preset process to transmit the content.

In this regard, in order to transmit content from one portable terminal to another portable terminal, content to be transmitted is selected, a send button is operated, a list of targets of reception of a file to be transmitted is generated, a target of the reception of the file to be transmitted is selected from the list, a procedure for authenticating the target of the reception is completed, a device corresponding to the target of the reception enters a stand-by state capable of receiving the file to be transmitted, and then the transmission of the file begins. Accordingly, the above-described method is inconvenient, due to its' cumbersome procedures.

Many users are also unfamiliar with wireless transmission technologies, such as Bluetooth, Wi-Fi Direct and Digital Living Network Alliance (DLNA), and are also unfamiliar with corresponding related technologies, such as searching, scanning, pairing, bonding, Wi-Fi Protected Setup (WPS), Security Simple Pairing (SSP), and Visibility and Discoverable. Accordingly, users may not be able to easily determine which wireless transmission technology is appropriate for transmission of a file with respect to a particular situation. An overly-simplified determination causes problems, in that each user transmits or receives content by using only a wireless transmission technology familiar to each user.

Also, when content is shared by using a wireless transmission technology such as Bluetooth (version 3.0 or below) or Wi-Fi, both a Bluetooth module and a Wi-Fi module of an apparatus for transmitting and receiving content must be activated. Accordingly, when the apparatus for transmitting and receiving content is a portable terminal powered by a battery, if both the Bluetooth module and the Wi-Fi module are continuously activated in order to share a file, excess power consumption occurs.

Also, a Bluetooth Low Energy (BLE) module, which is a short-range communication module referred to as Bluetooth 4.0, is characterized by operating with less power than modules using Bluetooth version 3.0 or below. Accordingly, a BLE module minimizes the consumption of a battery (not illustrated) of the portable terminal, even when the BLE module is continuously activated. The BLE module may be provided together with a module using Bluetooth version 3.0 or below, or may be provided on its own, in place of a module using Bluetooth version 3.0 or below.

However, when using a BLE module, one master terminal can make a communication connection with multiple slave terminals. By contrast, each slave terminal can make a communication connection with only one master terminal.

Accordingly, while a slave terminal performs BLE communication with a first master terminal, a second master terminal cannot perform BLE communication with the slave terminal. Therefore, there is a need for a method in which the second master terminal can make an automatic communication connection with the slave terminal, with which the second terminal cannot perform BLE communication, through another available communication module.

In this regard, a need exists for a method and an apparatus for transmitting content in a portable terminal which, in sharing content between portable terminals, can omit a cumbersome procedure for selecting a communication technology to be used to transmit content to a counterpart portable terminal that is also making a communication connection with another portable terminal, and that can minimize various settings required to transmit the content.

SUMMARY OF THE INVENTION

Aspects of the present invention are provided to address at least the above-mentioned problems and/or disadvantages and to provide at least the advantages described below. Accordingly, an aspect of the present invention is to provide a method and an apparatus for transmitting content in a portable terminal, which in sharing content between portable terminals, can omit a cumbersome procedure for selecting what communication technology is to be used to transmit content to (or share content with) a counterpart portable terminal currently performing a communication connection with another portable terminal, and that can minimize various settings required to transmit the content.

In accordance with an aspect of the present invention, a method of transmitting content by a portable terminal is provided. The method includes searching for devices, to each of which content is to be transmitted, by a first communication module of the portable terminal, and displaying information indicating devices discovered as a result of the search; determining, when a particular portable terminal to which the content is to be transmitted is selected from among the displayed information, whether the selected particular portable terminal is currently performing a communication connection with another portable terminal; requesting and receiving, through a second communication module of the portable terminal, in response to determining that the particular portable terminal is currently performing the communication connection with the another portable terminal, an address of a device matched to a selected transmission method; and making a communication connection with the particular portable terminal and transmitting the content to the particular portable terminal, through a third communication module of the portable terminal matched to the selected transmission method.

In accordance with another aspect of the present invention, an apparatus that transmits content in a portable terminal is provided. The apparatus includes a first communication module that searches for devices to each of which content is to be transmitted; a second communication module that transmits an address of a device; and a controller that controls the first communication module to search for the devices to each of which the content is to be transmitted, and performs a control operation for displaying information indicating devices discovered as a result of the search; determines, when a particular portable terminal to which the content is to be transmitted is selected from among the displayed information, whether the selected particular portable terminal is currently performing a communication connection with another portable terminal; controls the second communication module to request and receive, through a second communication module of the portable terminal, in response to determining that the particular portable terminal is currently performing the communication connection with the another portable terminal, an address of a device matched to a selected transmission method; and controls a third communication module of the portable terminal matched to the selected transmission method to make a communication connection with the particular portable terminal and to transmit the content to the particular portable terminal.

BRIEF DESCRIPTION OF THE DRAWINGS

The above and other aspects, features, and advantages of certain embodiments of the present invention will be more apparent from the following description taken in conjunction with the accompanying drawings, in which:

FIG. 3B is a second illustrative diagram illustrating a format of advertising data that a portable terminal broadcasts according to an embodiment of the present invention.

DETAILED DESCRIPTION OF EMBODIMENTS OF THE PRESENT INVENTION

Figure 1:
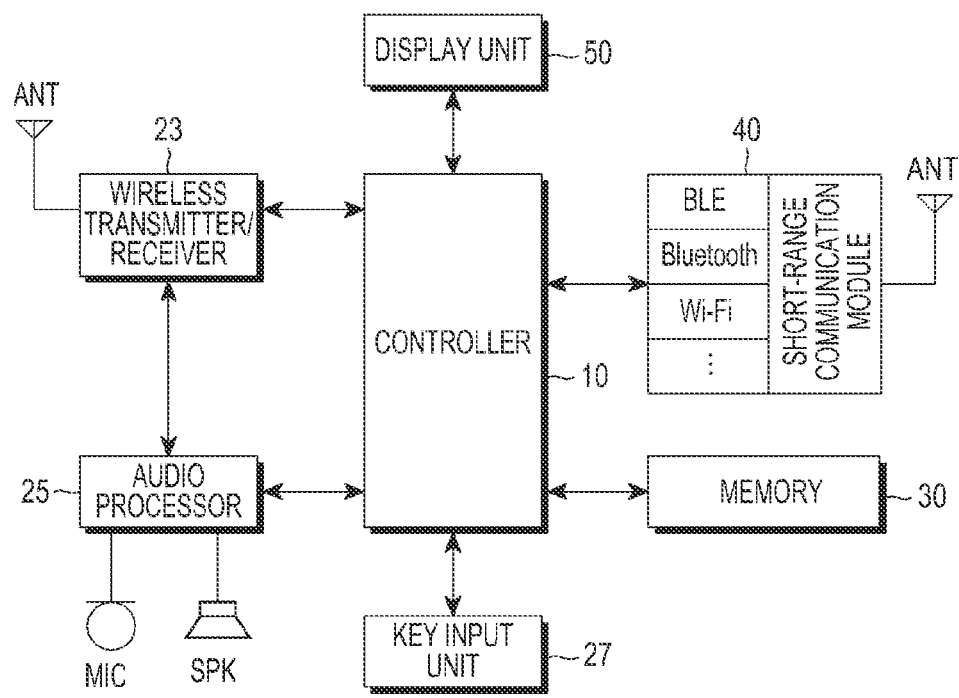
FIG. 1 is a block diagram schematically illustrating a configuration of a portable terminal according to an embodiment of the present invention.

The following description with reference to the accompanying drawings is provided to assist in a comprehensive understanding of embodiments of the invention. The following description includes various specific details to assist in understanding of embodiments of the present invention, but these details are to be regarded as mere examples. Accordingly, various changes and modifications of the embodiments described herein can be made without departing from the scope and spirit of the invention. The same or similar components may be designated by the name or similar reference numerals although they are illustrated in different drawings. In addition, descriptions of well-known functions and constructions may be omitted for clarity and conciseness.

The terms and words used in the following description and claims are not limited to their dictionary meanings, but are merely used to enable a clear and consistent understanding of embodiments of the invention. Accordingly, the following description of embodiments of the present invention is provided for illustration purposes only and does not limit the invention.

Herein, the singular forms "a," "an," and "the" include plural referents unless the context clearly dictates otherwise. Thus, for example, reference to "a component surface" includes reference to one or more of such surfaces.

Although the terms including ordinal numbers such as first and second may be used herein to describe various elements, these elements are not limited by these terms. Instead, these terms are only used to distinguish one element from another. For example, a first element could be referred to as a second element, and similarly, a 15 second element could be referred to as a first element, without departing from embodiments of the present invention. The terminology used herein merely describes particular embodiments, and does not limit embodiments of the present invention. As used herein, the term "and/or" includes any and all combinations of one or more of the associated listed items.

FIG. 1 is a block diagram schematically illustrating a configuration of a portable terminal (e.g., a transmission portable terminal or a reception portable terminal) according to an embodiment of the present invention.

Referring to FIG. 1, a portable terminal according to an embodiment of the present invention corresponds to an electronic device having weight and size that allows the device to be easily carried. Examples of portable terminals according to an embodiment of the present invention may include a feature phone, and electronic devices (e.g., a smart phone and a tablet Personal Computer (PC)) that are driven by operating systems, such as Bada, Tizen, Windows (e.g., Windows 8), iOS, and Android. In addition, examples of the portable terminals according to an embodiment of the present invention may include a laptop computer, a digital camera, a video phone, etc.

Herein, portable terminals according to embodiments of the present invention are not limited to the devices as described above. Embodiments of the present invention may also be applied even to other electronic devices (e.g., a desktop PC) that are inconvenient to carry. Accordingly, embodiments of the present invention may be applied to electronic devices including devices that are easy to carry as well as devices that are not easy to carry.

The portable terminal includes a wireless transmitter/receiver 23, which, in turn, includes a Radio Frequency (RF) unit and a modulator/demodulator (modem) (not shown). The RF unit includes an RF transmitter for upconverting the frequency of a signal to be transmitted and then amplifying the frequency-upconverted signal, an RF receiver for low-noise amplifying a received signal and then downconverting the frequency of the low-noise amplified signal, etc. The modem includes a transmitter for encoding and modulating a signal to be transmitted, a receiver for demodulating and decoding a signal received by the RF unit, etc.

The portable terminal further includes an audio processor 25, which may include a coder/decoder (codec) (not shown). The codec may include a data codec and an audio codec. The data codec processes packet data and other such data, while the audio codec processes audio signals, such as voice, a multimedia file, etc. The audio processor 25 converts a digital audio signal, which has been received by the modem, into an analog signal through the audio codec, and then reproduces the analog signal. The audio processor 25 converts an analog audio signal, which is generated from a microphone, into a digital audio signal through the audio codec, and then transmits the digital audio signal to the modem. The codec of the audio processor 25 may be included in a controller 10 of the portable terminal, or may be separately provided.

The portable terminal further includes a key input unit 27, which may include keys (not shown) for inputting numbers and text information and function keys for setting various functions, and may be in the form of either a touchpad or other such device (not shown). When the display unit 50 employs a touch screen (not shown), the key input unit 27 may include only a minimum number of predetermined keys. In this case, the display unit 50 may replace some of key input functions that would otherwise be performed via the key input unit 27.

The portable terminal further includes a memory 30, which may include (not shown) a program memory and a data memory. The program memory stores programs for controlling general operations of the portable terminal. The memory 30 may further include (not shown) external memories, including a Compact Flash (CF) memory card, a Secure Digital (SD) memory card, a Micro Secure Digital (Micro-SD) memory card, a Mini Secure Digital (Mini-SD) memory card, an Extreme Digital (XD) memory card, a memory stick, etc. The memory 30 may also include (not shown) disk storage devices, such as a Hard Disk Drive (HDD), a Solid State Disk (SSD), etc.

The memory 30 according to an embodiment of the present invention may store (or may temporarily store) one or more contents. Here, contents stored (or temporarily stored) in the memory 30 signify data that users may transmit and receive (e.g., share) by using their own respective portable terminals. For example, the contents may include a contact file such as vcf and multimedia files having extensions such as jpg, avi, mp3 etc.

The portable terminal further includes a short-range communication module 40 that provides a short-range communication function. The short-range communication module 40 according to an embodiment of the present invention includes (not shown) multiple communication modules, such as a Bluetooth module, a Bluetooth Low Energy (BLE) module, a Wi-Fi module, etc. The short-range communication module 40 according to an embodiment of the present invention may also include (not shown) an InfraRed Data Association (IrDA) module, an NFC module, a Zigbee module, an ANT module and a Radio Frequency Identification (RFID) module, although they are not illustrated in FIG. 1. FIG. 1 illustrates the short-range communication module 40 that includes only one antenna ANT. However, the short-range communication module 40 may include multiple antennas, the number of which is equal to the number of communication modules included in the short-range communication module 40.

According to an embodiment of the present invention, the low-power BLE module may be used as a first communication module for searching for a device, and the Bluetooth module may be used as a second communication module for transmitting an address of a device matched to a selected transmission method.

Also, while the BLE module is interlocked with the controller 10, the BLE module broadcasts advertising data including state information of the portable terminals (e.g., a first portable terminal and a second portable terminal). Such a configuration is described in later herein.

The portable terminal further includes a display unit 50, which may be implemented by a Liquid Crystal Display (LCD) and/or an Organic Light-Emitting Diode (OLED) display, such as a Passive Matrix Organic LED (PMOLED) display or an Active Matrix Organic LED (AMOLED) display, and outputs various pieces of display information generated by the portable terminal. The display unit 50 may include (not shown) a touch screen such as a capacitive/electrostatic touch screen or a resistive/pressure-sensitive touch screen. Through the touch screen, the user may operate the portable terminal (e.g., may touch each button of the portable terminal) by using only the display unit 50 or by using the display unit 50 and the key input unit 27 together.

The display unit 50 may include a digitizer (not shown), and the portable terminal may process the user's input by using only any one or both of the digitizer and the touch screen.

The controller 10 controls an overall operation of the portable terminal according to an embodiment of the present invention, and may change and control the operation of the portable terminal by the user's input provided by the key input unit 27, the display unit 50, etc.

Meanwhile, the controller 10, according to an embodiment of the present invention, performs a control operation for searching for a device, to which content is to be transmitted through the first communication module, and displaying information indicating the discovered device; performs a control operation for determining whether a selected particular portable terminal is currently performing a communication connection with another portable terminal, when the particular portable terminal to which the content is to be transmitted is selected from among the displayed devices; controls the second communication module to request and receive an address of a device matched to a selected transmission method, when the particular portable terminal is currently performing the communication connection with the another portable terminal; and controls a third communication module matched to the selected transmission method to make a communication connection with the particular portable terminal and to transmit the content to the particular portable terminal.

Also, when a simple and easy transmission function is activated, the controller 10, according to an embodiment of the present invention, performs a control operation for activating a page scan using the Bluetooth module as the second communication module and for activating the broadcasting of advertising data using the BLE module as the first communication module. When the transmission of content is requested, the controller 10 performs a control operation for searching for devices each including the BLE module, by performing a scan using the BLE module, and by displaying a list of the discovered devices. The list of the discovered devices may display a device name included in advertising data broadcasted by each device including the BLE module.

When a simple and easy transmission function is activated in the particular portable terminal, a page scan using the Bluetooth module (operating as the second communication module) is activated, or the broadcasting of advertising data using the BLE module as the first communication module is activated. Here, the advertising data may include information that enables the determination of whether the particular portable terminal makes a communication connection with another portable terminal.

The controller 10 may also analyze advertising data broadcasted by the particular portable terminal, and thereby may determine whether the particular portable terminal is currently performing a communication connection with another portable terminal.

Also, when the particular portable terminal is currently performing a communication connection with another portable terminal, the controller 10 may perform a control operation for sending a request for an address of a device matched to the selected transmission method to the counterpart portable terminal through the Bluetooth module as the second communication module, and then perform a control operation for receiving the address of the device matched to the selected transmission method from the counterpart portable terminal.

When the portable terminal has requested the address of the device, the particular portable terminal activates the third communication module matched to the requested address of the device, and transmits the requested address of the device to the portable terminal.

The method for transmitting content may be selected based on a wireless communication function having the highest speed or a wireless communication function matched to a size attribute of content intended to be transmitted, from among wireless communication functions available to be commonly used by the portable terminal and the particular portable terminal.

When the transmission of the content has been completed, the controller 10 may control the third communication module to be deactivated. When the counterpart portable terminal has completed the reception of the content, the third communication module of the counterpart portable terminal may be also deactivated.

Meanwhile, the portable terminal of FIG. 1 may include additional units, such as a camera module, a Digital Media Broadcasting (DMB) receiver, etc., which are not illustrated, in order to provide their own respective functions. For example, according to an embodiment of the present invention transmission, content shared (or transmitted/received) by the portable terminal and the reception portable terminal may be a still image file or a moving image file captured by a camera module (not shown), or may be a broadcast image file recorded by a Digital Multimedia Broadcasting (DMB) receiver (not shown).

Figure 2A:
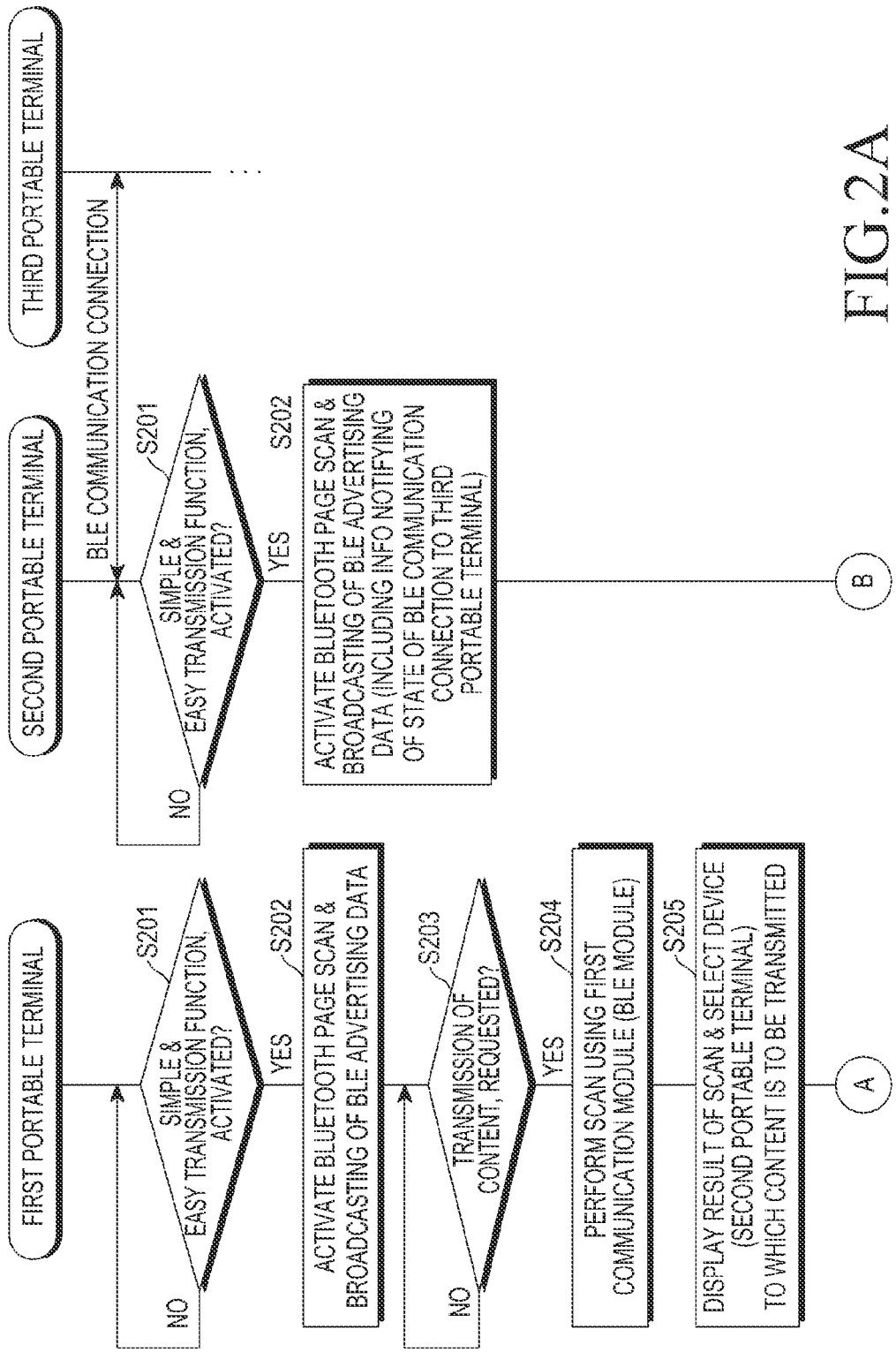
FIG. 2A and FIG. 2B are signal flow diagrams illustrating a method for transmitting content according to an embodiment of the present invention.
Figure 2B:
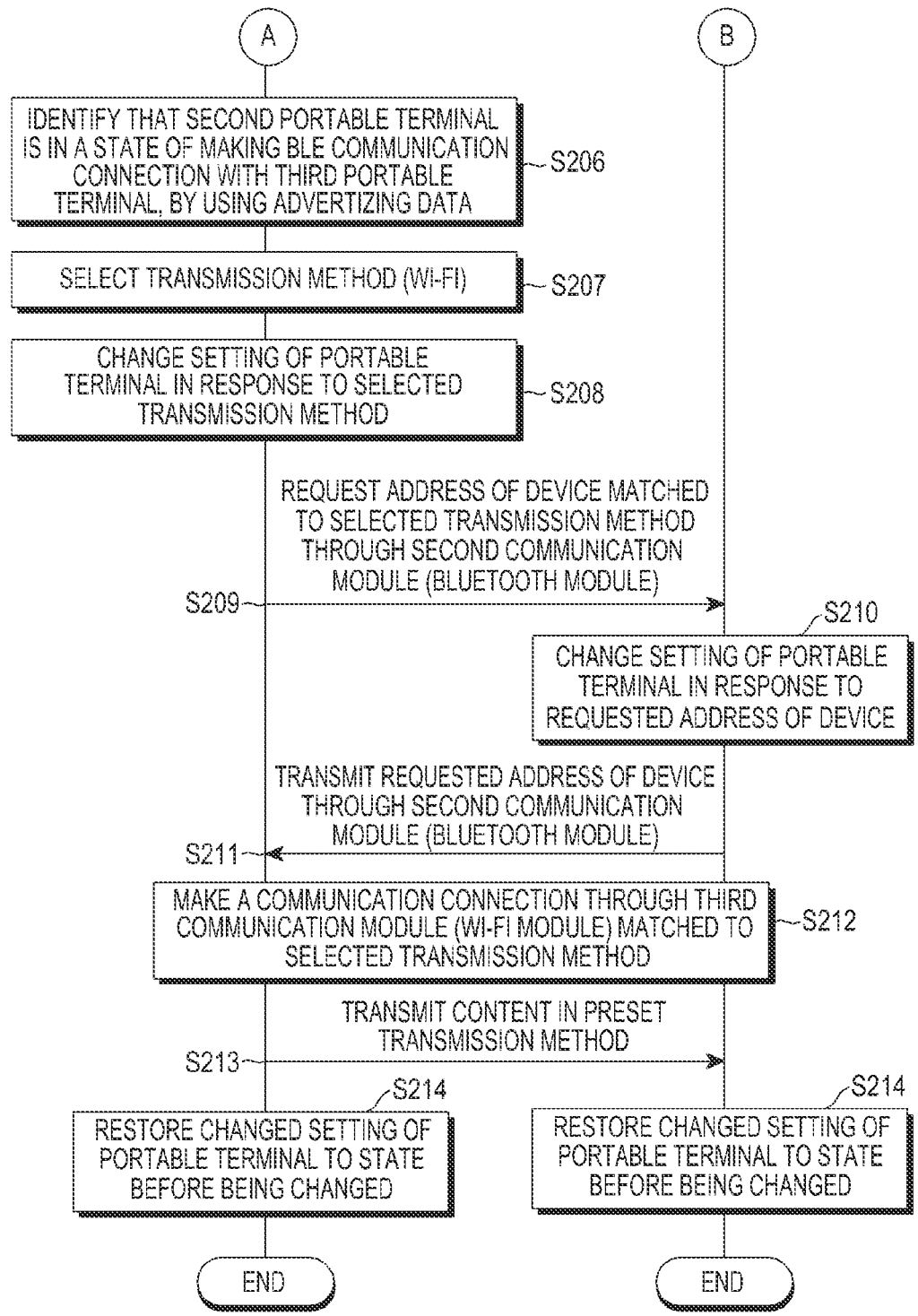

FIGS. 2A and 2B are signal flow diagrams illustrating a method for transmitting content according to an embodiment of the present invention. FIGS. 2A and 2B illustrate a process in which a user of the first portable terminal transmits predetermined content to (or shares predetermined content with) a user of the second portable terminal according to an embodiment of the present invention. With reference to FIGS. 2A and 2B, an example in which the second portable terminal as a slave terminal is in a state of making a BLE communication with a third portable terminal corresponding to a master terminal is described herein below.

Figure 3A:
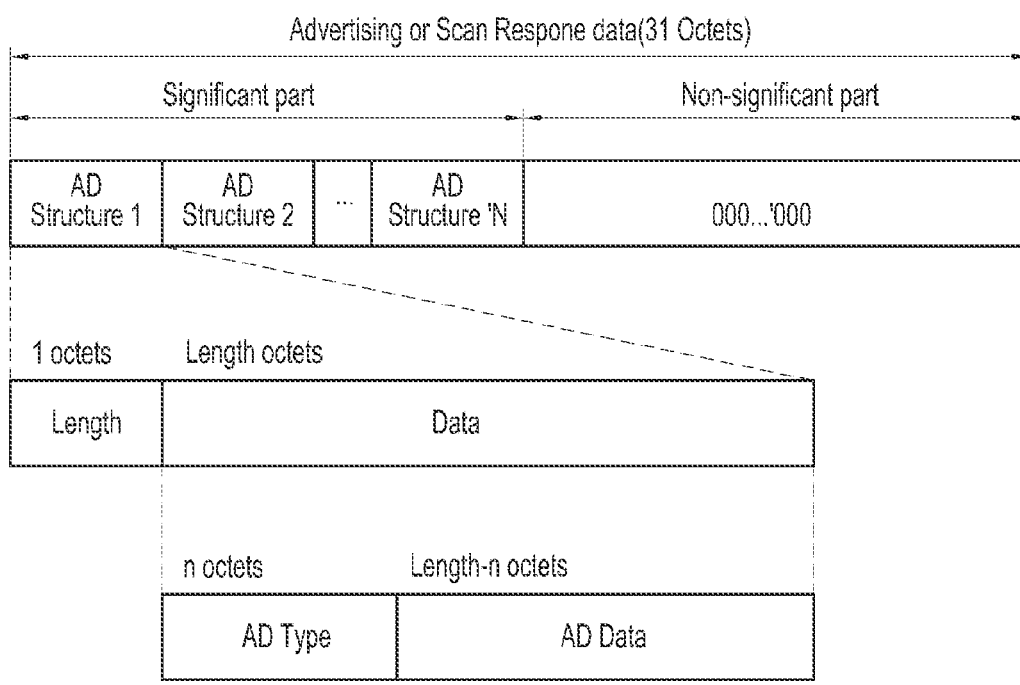
FIG. 3A is a first illustrative diagram illustrating a format of advertising data that a portable terminal broadcasts according to an embodiment of the present invention.
Figure 3C:
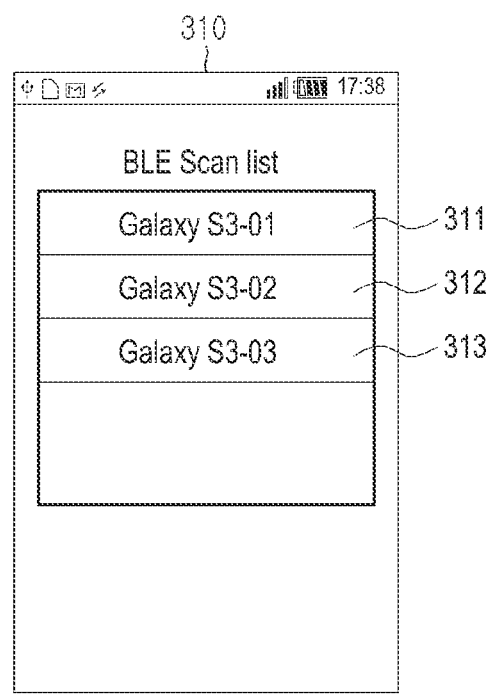
FIG. 3C is an illustrative diagram illustrating a method for transmitting content according to an embodiment of the present invention.

FIG. 3A is a first illustrative diagram illustrating a format of advertising data that a portable terminal broadcasts according to an embodiment of the present invention. FIG. 3B is a second illustrative diagram illustrating a format of advertising data that a portable terminal broadcasts according to an embodiment of the present invention. FIG. 3C is an illustrative diagram of a method for transmitting content according to an embodiment of the present invention. With reference to FIGS. 2A and 2B and FIGS. 3A, 3B and 3C, an embodiment of the present invention is described below.

In the following examples, a first portable terminal and a second portable terminal are described as subjects of certain respective operations. However, the subjects of these operations may be the controller of each portable terminal in conjunction with other elements included in each portable terminal that operate according to instructions of the controller. For convenience of description, the following example refers to the first portable terminal transmitting a file and the 10 second portable terminal receiving a file in order to distinguish between them. However, the first portable terminal may also receive a file and while the second portable terminal transmits a file, in accordance with embodiments of the present invention.

Referring to FIG. 2A, in steps S201 and S202, when a simple and easy transmission function is activated, each of the first portable terminal and the second portable terminal activates a page scan using the Bluetooth module and activates the broadcasting of advertising data using the BLE module.

According to an embodiment of the present invention, the simple and easy transmission function is a function named in view of resolving inconveniences of operations performed according to the related art in which content must be transmitted (or shared) through various complicated and cumbersome setting processes. Accordingly, when a simple and easy transmission function is activated according to an embodiment of the present invention, each of the first portable terminal transmitting content and the second portable terminal receiving content drives the Bluetooth module and the BLE module within the short-range communication module 40, activates a page scan of the Bluetooth module, and activates the broadcasting of advertising data of the BLE module.

By performing steps S201 and S202, the first portable terminal is able to receive advertising data of the second portable terminal, and the second portable terminal is able to receive advertising data of the first portable terminal. Since the second portable terminal is already performing a BLE communication connection with the third portable terminal, the BLE module of the second portable terminal is already being driven. Accordingly, the second portable terminal activates the broadcasting of advertising data.

According to an embodiment of the present invention, advertising data of the BLE module having a low power consumption rate is used to identify the type of wireless communication that is supported by a device that broadcasts advertising data.

For example, a portable terminal according to an embodiment of the present invention includes state information thereof including detailed data (e.g., AD structure 1 to AD structure N, as shown in FIG. 3A) of advertising data, and broadcasts the advertising data including the state information of the portable terminal. Advertising data and state information is described below with reference to FIGS. 3A and 3B.

Referring to FIG. 3A, a maximum size of advertising data prescribed in BLE is 31 bytes, and state information of the portable terminal (e.g., including information on the type of wireless communication, that the portable terminal supports, and information on whether the portable terminal makes a communication connection with another terminal) may be included in multiple detailed data (e.g., AD structure 1 to AD structure N) before the multiple detailed data including the state information of the portable terminal may be broadcasted. Accordingly, the second portable terminal may include, within advertising data, information indicating that the second portable terminal is currently operating as a slave terminal while performing a BLE communication with the third portable terminal corresponding to a master terminal, and may broadcast the advertising data including this information. Referring to FIG. 3B, detailed data of the advertising data includes multiple pieces of information, such as TX Power Level, Shortened Local Name, Random Target Address, Manufacturer Specific Data <<Protocol>>, Manufacturer Specific Data <<Capability>>, and Manufacturer Specific Data <<Others>>.

Each of the first portable terminal and the second portable terminal according to an embodiment of the present invention may acquire (or report) information on a device name of a device (e.g., the second portable terminal or the first portable terminal) that broadcasts advertising data, through data having an AD type named Shortened Local Name.

According to an embodiment of the present invention, each of the first portable terminal and the second portable terminal may acquire (or report) a device address (e.g., a BT (Bluetooth) address) of the device that broadcasts advertising data, through data having an AD type named Random Target Address.

According to an embodiment of the present invention, each of the first portable terminal and the second portable terminal may acquire (or report) information on a communication protocol (e.g., SSIP 1.0), through data having an AD type named Manufacturer Specific Data <<Protocol>>.

According to an embodiment of the present invention, each of the first portable terminal and the second portable terminal may acquire (or report) information on wireless communications that the second portable terminal (or the first portable terminal) may support among multiple wireless communications, as indicated in numbers 01 to 13 in FIG. 3B, through data having an AD type named Manufacturer Specific Data <<Capability>>.

For example, when 0x0000FF is recorded as AD data in an AD type named Manufacturer Specific Data <<Capability>> and advertising data including the AD type named Manufacturer Specific Data <<Capability>> in which 0x0000FF is recorded as AD data is broadcasted, each of the first portable terminal and the second portable terminal may acquire (or report) information such that the second portable terminal (or the first portable terminal) may support wireless communication functions, such as (01) Bluetooth BR/EDR, (02) Bluetooth AMP, (03) Bluetooth LE(BLE), (04) Wi-Fi, (05) Wi-Fi Direct, (06) Wi-Fi Display, (07) DLNA (All-Share), and (08) NFC and RFID.

Meanwhile, each portable terminal (e.g., each of the first portable terminal and the second portable terminal) may store an address (e.g., a BT address) of a device and a name thereof included in advertising data broadcasted by another portable terminal, and then may use the address of the device and the name thereof when a result of a search using the BLE module as described below is displayed.

In steps S203 to S205, when a user requests the first portable terminal to transmit predetermined content, the first portable terminal performs a scan by using a first communication module (e.g., a low-power BLE module) for a search, displays a result of the scan, and receives an input corresponding to the selection of a device to which content is to be transmitted.

According to an embodiment of the present invention, when the user requests the first portable terminal to transmit content, the first portable terminal performs a scan using the BLE module. Alternatively, when the first portable terminal receives advertising data broadcasted by another portable terminal (e.g., the second portable terminal), the first portable terminal may perform a scan using the BLE module. Since the first portable terminal and the second portable terminal are both broadcasting advertising data, the first portable terminal temporarily stops the broadcasting of advertising data, and then performs the BLE scan.

The first portable terminal displays, to a user, a list of at least one device discovered through the scan using the BLE module and receives, from the user, an input corresponding to the selection of a device to which content is intended to be transmitted.

Referring to FIG. 3C, the first portable terminal displays devices discovered through the scan using the BLE module on a display screen 310, as denoted by reference numerals 311, 312 and 313, and receives, from the user, an input (e.g., a touch input corresponding to the selection of a device denoted by reference numeral 311) corresponding to the selection of a portable terminal to which content is intended to be transmitted. At this time, a name of each of the devices denoted by reference numerals 311, 312 and 313 on the display screen 310 illustrated in FIG. 3C may be a device name (e.g., data having an AD type named Shortened Local Name) included in advertising data broadcasted by the relevant device.

In steps S206 to S208, when the device to which content is to be transmitted has been selected, the first portable terminal analyzes advertising data broadcasted by the selected device, and is thereby able to identify that the selected device (i.e., the second portable terminal) is performing a BLE communication connection with another terminal (i.e., the third portable terminal). Accordingly the first portable terminal selects a transmission method other than the BLE communication, changes a setting of the portable terminal in response to the selected transmission method, and sends, to the selected device (i.e., the second portable terminal), a request for an address of a device matched to the selected transmission method through the second communication module (e.g., the Bluetooth module) for transmitting a device address. The first portable terminal may set a secured communication link with the second portable terminal via Radio Frequency Communication (RFCOMM) in Bluetooth Basic Rate/Enhanced Data Rate (BR/EDR) (BlueTooth (BT) Classic or BT version 3.0 or below) by using the Bluetooth module, and may send the request for the address of the device to the second portable terminal through the set secured communication link.

When the user has selected the device (i.e., the second portable terminal) to which content is intended to be transmitted as described above with reference to FIG. 3C, the first portable terminal analyzes the advertizing data broadcasted by the second portable terminal to which content is to be transmitted, and thereby is able to recognize that the second portable terminal is operating as a slave terminal while performing a BLE communication connection with the third portable terminal corresponding to a master terminal. Accordingly, because the first portable terminal may not perform BLE communication with the second portable terminal while the second portable terminal is performing BLE communication as a slave terminal, the first portable terminal selects another communication method other than the BLE communication.

According to an embodiment of the present invention, the first portable terminal analyzes the advertizing data of the second portable terminal and thereby determines which type of wireless communication function is available to be commonly used by the first portable terminal and the second portable terminal, and selects any one wireless communication function from among the available functions. For example, the first portable terminal may compare data having an AD type named Manufacturer Specific Data <<Capability>> of advertising data broadcasted by itself with data having an AD type named Manufacturer Specific Data <<Capability>> of advertising data broadcasted by the second portable terminal, and thereby may determine which wireless communication function is available to be commonly used by the first portable terminal and the second portable terminal.

After the first portable terminal determines the type of communication (e.g., a wireless communication function) to be commonly used by the first portable terminal and the second portable terminal, the first portable terminal selects any one of communications available to be commonly used by the first portable terminal and the second portable terminal, according to preset criteria.

For example, the first portable terminal may select a wireless communication function that has the highest transmission speed, from among wireless communication functions that are available to be commonly used by itself and the second portable terminal. For example, when a wireless communication function of Bluetooth (version 3.0 or below) and a wireless communication function of Wi-Fi are commonly usable by the first portable terminal and the second portable terminal, Wi-Fi, which has a relatively higher speed, may be selected.

As another example, the first portable terminal may identify a size attribute of content intended to be transmitted, and select a wireless communication function according to the identified size attribute, from among wireless communication functions available to be commonly used by the first portable terminal and the second portable terminal.

For example, the transmission of content using Bluetooth can be disadvantageous in terms of transmission speed but can be advantageous in terms of latency. Therefore, when the content to be transmitted has a small data size, a transmission method using Bluetooth is desirable. Accordingly, when a wireless communication function of Bluetooth (version 3.0 or below) and a wireless communication function of Wi-Fi are commonly usable, if the size of content is less than a preset size (e.g., 1 Mb), a wireless communication function having low latency (e.g., transmission delay speed) such as Bluetooth (version 3.0 or below) may be selected. Meanwhile, if the size of content is greater than the preset size (e.g., 1 Mb), Wi-Fi having a high transmission speed may be selected.

In steps S209 to S212, the first portable terminal sends, to the second portable terminal through the second communication module (e.g., the Bluetooth module), a request for an address of a device matched to the selected transmission method for transmitting an address of a device. The second portable terminal changes a setting thereof in response to the request for the address of the device, and then transmits, to the first portable terminal through the Bluetooth module corresponding to the second communication module, the requested address of the device. Then, the first portable terminal makes a communication connection with the second portable terminal through the third communication module matched to the selected transmission method.

For example, when a Wi-Fi transmission method using the Wi-Fi module is selected, the first portable terminal sends, to the second portable terminal (through, for example, the Bluetooth module corresponding to the second communication module), a request for a Wi-Fi Media Access Control (MAC) address of the second portable terminal. In response to the request, the second portable terminal changes a setting thereof (e.g., activates the Wi-Fi module thereof), and transmits the Wi-Fi Mac Address thereof to the first portable terminal. Specifically, when the Wi-Fi MAC address is requested, the second portable terminal determines whether the Wi-Fi module of the second portable terminal is activated. When the Wi-Fi module of the second portable terminal is not activated, the second portable terminal activates the Wi-Fi module of the second portable terminal, and transmits the Wi-Fi MAC address of the second portable terminal to the first portable terminal. The communication module of the first portable terminal matched to the selected transmission method is also activated at this time.

Accordingly, a request for the address of the device matched to the selected transmission method sent from the first portable terminal to the second portable terminal can be considered to be a request for also activating the communication module (e.g., the Wi-Fi module) matched to the selected transmission method to the second portable terminal.

As described above in a method according to an embodiment of the present invention, the first communication module (i.e., the BLE module), which consumes low power, for searching for a device is used to search for a device to which content is to be transmitted; a transmission method (e.g., the type of wireless communication) in which content is to be transmitted is selected; when the discovered device is currently performing a BLE communication connection with another device, the second communication module (the Bluetooth module) for transmitting an address of a device is used to request and receive an address of a device matched to the selected transmission method; and a connection is made and the content is transmitted through the third module (the Wi-Fi module) matched to the selected transmission method.

For example, when a set transmission method is Wi-Fi Direct using the Wi-Fi module, the first portable terminal and the second portable terminal automatically perform a series of processes, such as device discovery, service discovery and group creation, and form a Wi-Fi Direct connection between the two portable terminals.

Alternatively, when the set transmission method is Bluetooth communication using the Bluetooth module, the second communication module for transmitting an address of a device becomes equivalent to the third communication module for transmitting content.

In steps S213 and S214, the first portable terminal transmits content in the selected transmission method, and each of the first portable terminal and the second portable terminal restores their respective communication settings (to their states existing before being changed in order to transmit/receive the content.

When the first portable terminal makes a communication connection with the 25 second portable terminal in response to the selected transmission method in the previous steps (i.e., prior to steps S213 and S214), the first portable terminal transmits the content, which has been requested to be transmitted, to the second portable terminal.

The first portable terminal may notify the user of a progress state of transmission of content or whether the transmission of content has been completed, by providing visual information through the display unit 50 or audio information (e.g., voice information) through the audio processor 25. The reception portable terminal may notify the user of a progress state of reception of content or whether the reception of content has been completed.

Meanwhile, when the transmission of the content requested to be transmitted (or reception of content requested to be shared) is completed, each of the first portable terminal and the second portable terminal may restore their respective settings to their respective states existing before being changed in order to transmit the content.

For example, when each of the first and second portable terminals changes a setting thereof so as to activate the Wi-Fi module, which was in a deactivation state in order to transmit (or receive) content, each of the first and second portable terminals may restore the setting thereof to its state before being changed so as to cause the Wi-Fi module to be deactivated as in its original state, after the completion of the transmission and reception of content.

According to embodiments of the present invention, just by activating a function named a simple and easy transmission function, settings required to transmit and receive content between portable terminals are automatically obtained, so that users can conveniently share content.

Also, according to embodiments of the present invention, when the transmission and/or reception of content has been completed, each communication module used to transmit and/or receive content is automatically deactivated, so that it is possible to minimize power consumption of each portable terminal.

Further, according to embodiments of the present invention, a counterpart portable terminal that makes a communication connection with another portable terminal, can simply and easily transmit content through another available communication module.

While the invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of transmitting content by a portable terminal, the method comprising:
    searching for devices, to each of which content is to be transmitted, by a first communication module of the portable terminal, and displaying information indicating devices discovered as a result of the search;
    determining, when a particular portable terminal to which the content is to be transmitted is selected from among the displayed information, whether the selected particular portable terminal is currently performing a communication connection with another portable terminal;
    requesting and receiving, through a second communication module of the portable terminal, in response to determining that the particular portable terminal is currently performing the communication connection with the another portable terminal, an address of a device matched to a selected transmission method; and
    making a communication connection with the particular portable terminal and transmitting the content to the particular portable terminal, through a third communication module of the portable terminal matched to the selected transmission method.

2. The method as claimed in claim 1, wherein displaying the information indicating the discovered devices comprises:
    activating, when a simple and easy transmission function is activated, a page scan using a Bluetooth module as the second communication module and activating broadcasting of advertising data using a Bluetooth Low Energy (BLE) module as the first communication module; and
    searching, when the transmission of the content is requested, for devices each including the BLE module by performing a scan using the BLE module, and displaying a list of the discovered devices.

3. The method as claimed in claim 2, wherein the list of the discovered devices displays a device name included in advertising data broadcasted by each device including the BLE module.

4. The method as claimed in claim 1, further comprising performing, when a simple and easy transmission function is activated in the particular portable terminal, at least one of activating a page scan using a Bluetooth module as the second communication module and activating broadcasting of advertising data using a BLE module as the first communication module,
    wherein the advertising data includes information that enables the determination of whether the particular portable terminal is currently performing the communication connection with the another portable terminal.

5. The method as claimed in claim 1, wherein determining whether the selected particular portable terminal is currently performing the communication connection with the another portable terminal is performed by analyzing advertising data broadcasted by the particular portable terminal.

6. The method as claimed in claim 1, wherein requesting and receiving the address of the device matched to the selected transmission method comprises:
    sending, when the particular portable terminal is in the state of making the communication connection with the another portable terminal, request for an address of a device matched to the selected transmission method to the particular portable terminal through a Bluetooth module operating as the second communication module; and
    receiving the address of the device matched to the selected transmission method from the particular portable terminal through the Bluetooth module operating as the second communication module.

7. The method as claimed in claim 6, further comprising activating, when the particular portable terminal receives the request for the address of the device from the portable terminal, the third communication module matched to the requested address of the device and transmitting the requested address of the device to the portable terminal, by the particular portable terminal.

8. The method as claimed in claim 1, wherein the transmission method is selected based on a wireless communication function having at least one of a highest speed and a wireless communication function matched to a size attribute of content intended to be transmitted, from among wireless communication functions which are commonly available to be used by the portable terminal and the particular portable terminal.

9. The method as claimed in claim 1, further comprising:
    deactivating, by the portable terminal, the third communication module by the portable terminal, in response to at least one of the portable terminal completing the transmission of the content and
    the particular portable terminal completing reception of the content.

10. An apparatus that transmits content in a portable terminal, the apparatus comprising:
    a first communication module that searches for devices to each of which content is to be transmitted;
    a second communication module that transmits an address of a device; and
    a controller that controls the first communication module to search for the devices to each of which the content is to be transmitted, and performs a control operation for displaying information indicating devices discovered as a result of the search; determines, when a particular portable terminal to which the content is to be transmitted is selected from among the displayed information, whether the selected particular portable terminal is currently performing a communication connection with another portable terminal; controls the second communication module to request and receive, through a second communication module of the portable terminal, in response to determining that the particular portable terminal is currently performing the communication connection with the another portable terminal, an address of a device matched to a selected transmission method; and controls a third communication module of the portable terminal matched to the selected transmission method to make a communication connection with the particular portable terminal and to transmit the content to the particular portable terminal.

11. The apparatus as claimed in claim 10, wherein the controller performs a control operation for activating, when a simple and easy transmission function is activated, a page scan using a Bluetooth module as the second communication module and activating broadcasting of advertising data using a Bluetooth Low Energy (BLE) module as the first communication module, and performs a control operation for searching, when the transmission of the content is requested, for devices each including the BLE module by performing a scan using the BLE module, and displaying a list of the discovered devices.

12. The apparatus as claimed in claim 11, wherein the list of the discovered devices displays a device name included in advertising data broadcasted by each device including the BLE module.

13. The apparatus as claimed in claim 10, wherein, when a simple and easy transmission function is activated in the particular portable terminal, at least one of a page scan using a Bluetooth module operating as the second communication module is activated and broadcasting of advertising data using a BLE module as the first communication module is activated, and wherein the advertising data includes information that enables the determination of whether the particular portable terminal is currently performing a communication connection with the another portable terminal.

14. The apparatus as claimed in claim 10, wherein the controller determines that the particular portable terminal is currently performing a communication connection with the another portable terminal, by analyzing advertising data broadcasted by the particular portable terminal.

15. The apparatus as claimed in claim 10, wherein, when the particular portable terminal is currently performing the communication connection with the another portable terminal, the controller controls a Bluetooth module operating as the second communication module to send a request for an address of a device matched to the selected transmission method to the particular portable terminal, and controls the Bluetooth module operating as the second communication module to receive the address of the device matched to the selected transmission method from the particular portable terminal.

16. The apparatus as claimed in claim 15, wherein the particular portable terminal activates the third communication module matched to the requested address of the device and transmits the requested address of the device to the portable terminal, when the particular portable terminal receives the request for the address of the device from the portable terminal.

17. The apparatus as claimed in claim 10, wherein the transmission method is selected based on at least one of a wireless communication function having a highest speed and a wireless communication function matched to a size attribute of content intended to be transmitted, from among wireless communication functions that are commonly usable by the portable terminal and the particular portable terminal.

18. The apparatus as claimed in claim 10, wherein the portable terminal deactivates the third communication module, in response to at least one of the portable terminal completing the transmission of the content and the particular portable terminal completing reception of the content.

* * * * *